United States Patent
Yasenchak et al.

[15] 3,665,148
[45] May 23, 1972

[54] SIX-AXIS MANIPULATOR

[72] Inventors: Richard W. Yasenchak, Farmington; Raymond A. Schomer, Royal Oak; Ernest V. Harper, Utica, all of Mich.

[73] Assignee: General Motors Corporation, Detroit, Mich.

[22] Filed: Apr. 7, 1971

[21] Appl. No.: 132,062

[52] U.S. Cl. ................................219/125, 219/80, 228/45
[51] Int. Cl. ..........................................................B23k 9/12
[58] Field of Search ....................219/125, 124, 78, 79, 80; 228/45; 269/60, 71

[56] References Cited

UNITED STATES PATENTS

| | | |
|---|---|---|
| 2,749,421 | 6/1956 | Mikulak et al..........................219/125 |
| 3,119,009 | 1/1964 | Zeller ....................................219/125 |
| 3,555,239 | 1/1971 | Kerth......................................219/125 |

*Primary Examiner*—J. D. Miller
*Assistant Examiner*—B. A. Reynolds
*Attorney*—J. L. Carpenter, E. J. Biskup and P. D. Sachtjen

[57] ABSTRACT

A six-axis manipulator for positioning a workhead with respect to articles moving on an assembly line is provided with multiple degrees of freedom including three mutually perpendicular rectilinear axes and three rotational axes. Electric servo motors and precision ball screw drives coordinately position the workhead about the rectilinear axes for achieving primary orientation of the workhead and a precision chain drive and a dual input, single output differential gear unit universally position the workhead about the rotational axes for achieving secondary orientation in a desired work processing relationship with the articles.

4 Claims, 7 Drawing Figures

Patented May 23, 1972

INVENTORS.
Richard W. Yasenchak,
Raymond A. Schomer &
BY Ernest V. Harper

Peter O. Sachtjen
ATTORNEY

INVENTORS.
Richard W. Yasenchak,
Raymond A. Schomer &
BY Ernest V. Harper
Peter D. Sachtjen
ATTORNEY Patented May 23, 1972

INVENTORS.
Richard W. Yasenchak,
Raymond A. Schomer &
Ernest V. Harper
BY Peter D. Saeltjen
ATTORNEY INVENTORS.
Richard W. Yasenchak,
Raymond A. Schomer &
Ernest V. Harper
BY Peter O. Saeltjen
ATTORNEY

SIX-AXIS MANIPULATOR

This invention relates to a machine having 6° of freedom for positioning a workhead such as a spot welder in universal work processing relationship with respect to articles moving past the machine.

Automatically controlled machines or manipulators, have recently gained acceptance as highly efficient apparatus for executing complex motions into relatively inaccessible areas to perform work processing operations such as welding, drilling assembling, painting, handling, and the like. To provide the requisite flexibility for operations of the above type, the machine must accurately and repetitively execute prescribed motions to maneuver the workhead through space to a primary coordinate position while simultaneously universally positioning the workhead to a secondary position for assuming a desired work processing relationship. Conventionally, the above movements are executed in accordance with a digital control program including a memory unit which serves to sequentially move the workhead through a predetermined pattern of motion. The workhead is oriented in this manner by suitable drive units which operate the component parts of the apparatus for select movement about various pivotal, rotational, and rectilinear axes.

When the manipulator is incorporated into a moving production line certain additional capabilities are necessary. First, the machine must be able to provide universal positioning of the workhead. This will require 3° of freedom for coordinate spacial positioning, namely, controlled vertical, longitudinal, and lateral movement. This primary positioning must be further refined by secondary movement to achieve universal positioning of the workhead and generally requires three axes of rotational movement to establish the correct attitude for the desired processing operation. While these six degrees of freedom can be somewhat reduced by combining extensible and pivotal movements for jointly achieving the primary and secondary aspects of positioning, an independent motion for each degree of freedom is most desirable. Secondly, the machine must compensate for production line speed so that the machine attains the correct longitudinal position with respect to the article at the time of work processing. In other words, the machine must constantly correct for line movement from the time the machine cycle is initiated. This is not readily obtainable without completely independent axes of movement. Thirdly, the machine should execute its sequence of motions in the shortest possible distance thereby conserving production line space and increasing the production rate. This capability requires drive means for selectively maneuvering the component parts about their axes of freedom with the utmost speed and repeatability. Unless positive high response drive means are provided, the resulting inaccurate and slow positioning of the workhead will lead to inefficient operation of the machine.

The machine made in accordance with the present invention fully satisfies the above criteria and provides a six-axis manipulator which is capable of quickly and repetitively universally positioning the workhead in space to achieve accurate work processing relationship with an article moving along a production line. More specifically, these capabilities are achieved by providing freedom of movement along three rectilinear axes and about three rotational axes. The apparatus comprises five basic parts, a vertical mast movable along a support platform paralleling the production line, a carriage vertically movable along the mast, a boom rotatable within the carriage and reciprocable transversely with respect to the production line, and a workhead universally supported at the end of the boom. Longitudinal movement paralleling the production line is provided by an electric servo motor and ball screw drive which corrects the position of the workhead in accordance with line movement. The rectilinear vertical and transverse positioning is also provided by high torque, anti-back lash electric motor and ball screw drives, each of which provides accurate indexing in accordance with rotation thereof. This drive train provides an inherently repetitive and easily monitored drive mechanism for accurately positioning the workhead along the primary coordinate axes.

The secondary or universal positioning of the workhead is achieved by three degrees of rotational freedom. The workhead is rotatable about a transverse axis by rotation of the boom to infinitely circumferentially index the workhead with respect to the article. A precision electric motor and chain drive is provided for this motion. The workhead is connected to a dual input single output differential gear unit carried at the end of the boom and comprises input gears having a first axis of rotation transverse to the boom and an output gear and shaft having a second axis of rotation perpendicular to the first axis. A pair of drive shafts extend through the boom to the input gears. By selectively rotating one or both of the drive shafts, the workhead is infinitely positionable in a bend path perpendicular to the boom rotation and in a swivel path about the output gear shaft. These combined rotational movements thus provide complete universal positioning of the workhead with respect to the article. The aforementioned precision drives and full complement of independent rotational and rectilinear axes of movement which are coordinated to line movement ensure that the present machine is fully adapted for optimum utilization in processing articles moving along a production line.

The above and other features of the present invention will be apparent to one skilled in the art upon reading the following detailed description, reference being made to the accompanying drawings showing a preferred embodiment in which.

Figure 1:
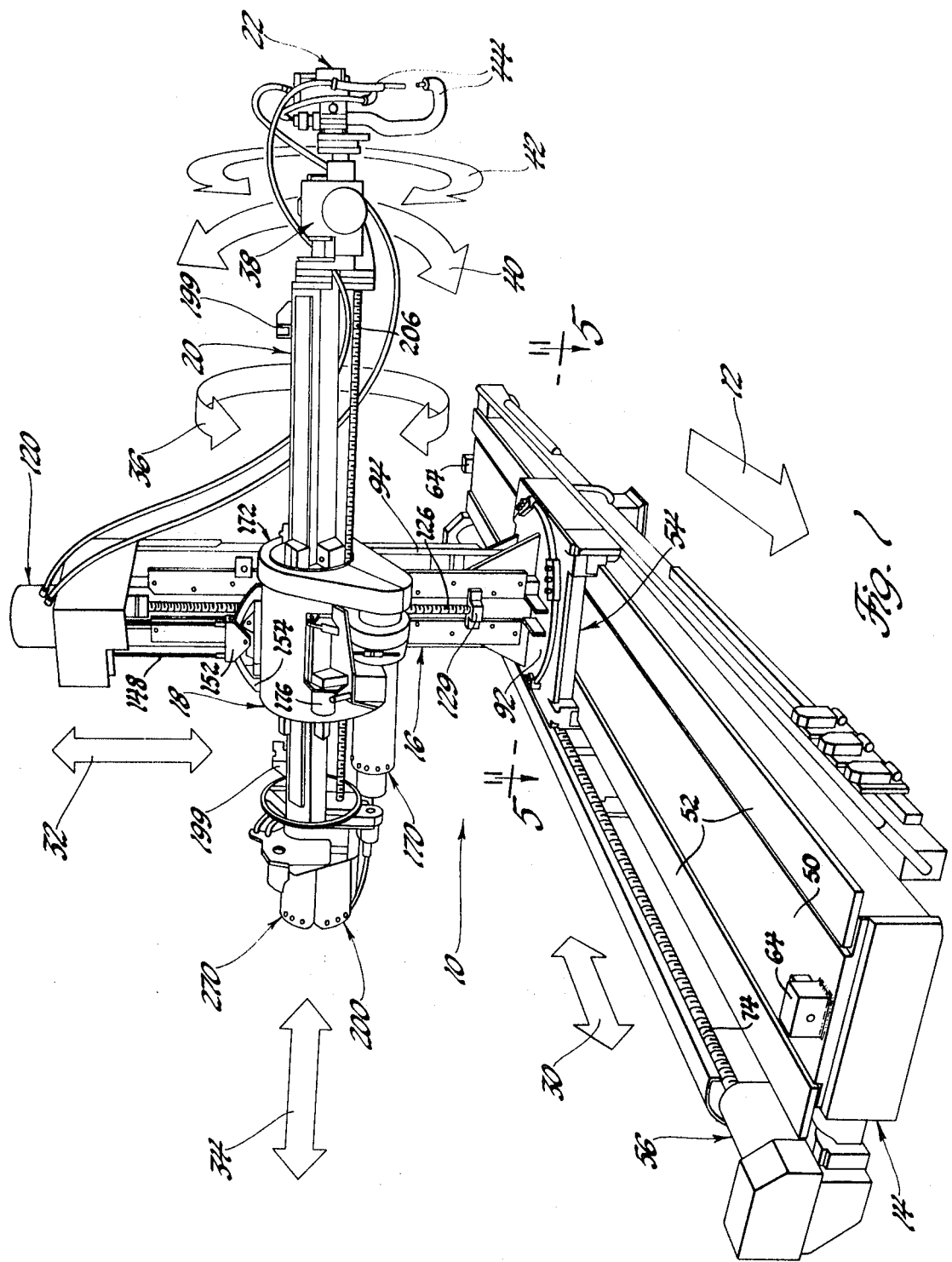
FIG. 1 is a perspective view of a six-axis manipulator made in accordance of the present invention.

Referring to FIG. 1, there is shown a six-axis manipulator or machine 10 which is suitable for digital program controlled movement to achieve universal work processing relationships with respect to articles moving along a conveyor path 12. The program control is achieved through conventional digital shaft positioning encoders and analog-digital converters which are automatically operable under the control of digital information to selectively actuate drive means for achieving prescribed movements in the manner hereinafter described. Inasmuch as the controls form no part of the present invention, further description will proceed with reference to the influence of the drive units in providing the requisite movement, it being understood that the sequencing information therefor is in accordance with suitable program control apparatus.

The manipulator 10 generally comprises a support platform 14, a vertical arm or mast 16, a carriage 18, a horizontal arm or boom 20, and a spot welder or workhead 22. The support platform 14 generally parallels the conveyor line 12 and guidably supports the vertical mast 16 for controlled movement along a first rectilinear axis in a longitudinal path 30. The carriage 18 is carried by the mast 16 for controlled movement along a second rectilinear axis in a vertical path 32. The boom 20 is reciprocably and rotatably supported on the carriage 18 for guided movement along a third rectilinear axis in a lateral or transverse path 34 and for circumferential movement about a first rotational axis in a rotary or circular path 36. The workhead 22 is supported at the end of the boom 20 by a differential gear unit 38 which accommodates movement about a second rotational axis in a bend path 40 normal to the transverse path 34 and the rotary path 36, and about a third rotational axis in a swivel path 42 normal to the bend path 40.

The component parts are individually and selectively movable with respect to articles traversing the conveyor path 12 by drive means to be hereinafter described. Thus, the workhead 22, which in the present instance comprises a spot welder having welding jaws 44, but which may comprise any of the aforementioned processing fixtures, is movable in the paths 30, 32 and 34 along mutually perpendicular axes to achieve primary coordinate positioning. The workhead 22 is universally positioned in the paths 38, 40 and 42 about the serially perpendicular rotational axes for achieving secondary positioning so that the jaws 44 bear a predetermined attitude or work processing relationship with the articles traversing the conveyor path 12.

Figure 5:
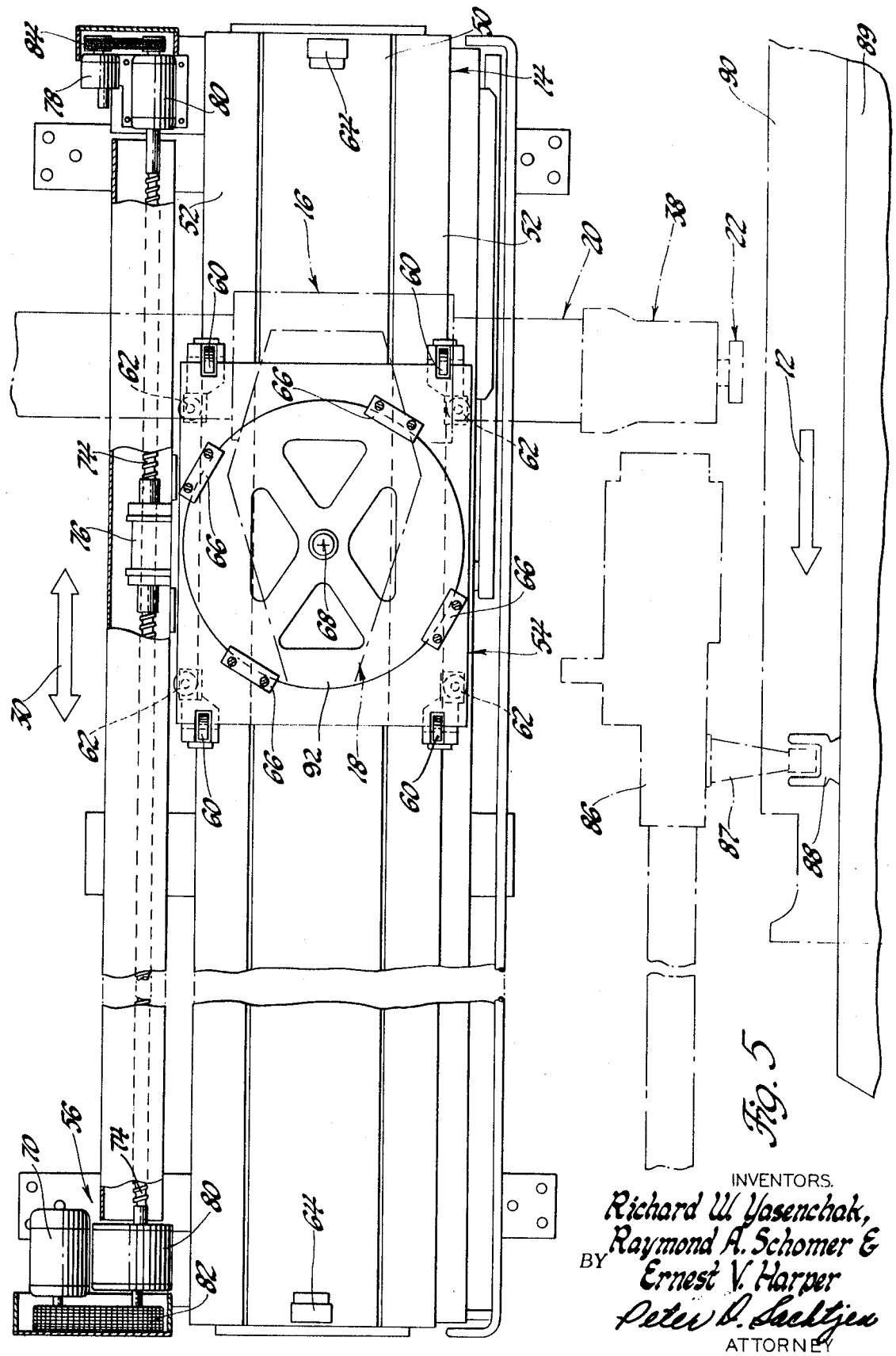
FIG. 5 is an enlarged partially sectioned view taken along line 5—5 of FIG. 1.

Referring to FIG. 5, the support platform 14 generally comprises an elongated support bed 50 having a pair of laterally spaced horizontal guide rails 52 which extend generally parallel to the support platform 14 and the conveyor path 12. A rectangular support cart 54 is guidably supported on the rails 52 for horizontal movement along the longitudinal path 30 as controlled by a drive unit 56.

Four support rollers 60 are attached at the lateral sides of the cart 54 and engage the top surface of the rails 52 to provide low friction horizontal movement along the support platform 14. Four vertically oriented guide rollers 62 carried at the longitudinal sides of the cart 54 engage the sides of guide rails 52 to horizontally constrain movement to the longitudinal path 30. Stops 64 are fixedly attached at each end of the support bed 50 and define the permissible limits of horizontal travel for the cart 54. Additionally, four circumferentially spaced clamping plates 66 are adjustably connected to the cart 54 for positioning the mast 16 and the boom 20 about the vertical axis 68. This adjustment is provided so that the workhead 22 can achieve the fullest utilization of movement along the rectilinear paths such as would occur with articles obliquely oriented with respect to the conveyor path 12.

The drive unit 56 generally comprises an electric motor 70, a lead screw 74 operatively coupled to a ball nut 76, and a rotary encoder 78. The motor 70 is preferably a precision DC servo motor having a high torque starting capability. The lead screw 74 is rotatably supported between two pillow blocks 80 positioned at opposite ends of the platform 14. The motor 70 and the encoder 78 are operatively coupled to the ends of the lead screw 74 at the pillow blocks 80 by timing chains 82 and 84, respectively. The ball nut 76 is fixedly attached to the side of the support cart 54 and with the lead screw 74 provides a drive connection having certain desirable characteristics for apparatus of the disclosed type namely, a low torque drive, an inherently accurate axial positioning per revolution, and substantially zero backlash.

The encoder 78 or analog-to-digital converter is conventional in construction and generates a digital signal representing the position of the mast 16 as related to lead screw revolutions. The signal from the encoder 78 is fed to the input of a conventional comparing unit in the program control apparatus. The output signal of the comparing unit is fed to a control device which deenergizes the motor 70 to deenergize and brake the latter when there is an identity between the programmed mast position represented in the memory unit of the program control apparatus and the actual mast position signaled by the encoder 78.

By means of a line tracker 86 positioned at the side of the support platform 14, the movement of the conveyor path 12 is monitored and operatively coupled to the drive unit 56, the encoder 78, and the comparing unit in the program control apparatus. The tracker 86 includes a latching dog 87 which engages a gate lock 88 on a conveyor truck 89 carrying articles such as vehicle panels 90 along the conveyor path 12. The tracker 86 thus serves to coordinate the position of the mast 16 to the articles moving on the conveyor path 12 so as to compensate for article and line movement whereby the workhead 22 executes the programmed sequence independent of conveyor motion. The tracker 86 is preferably of the type disclosed in the pending application Ser. No. 132,063, filed Apr. 7, 1971, entitled "Position Compensator for Programmed Work Device" by Ernest V. Harper et al., assigned to the assignee of the present invention, and reference may be made thereto for details of construction and operation.

Figure 6:
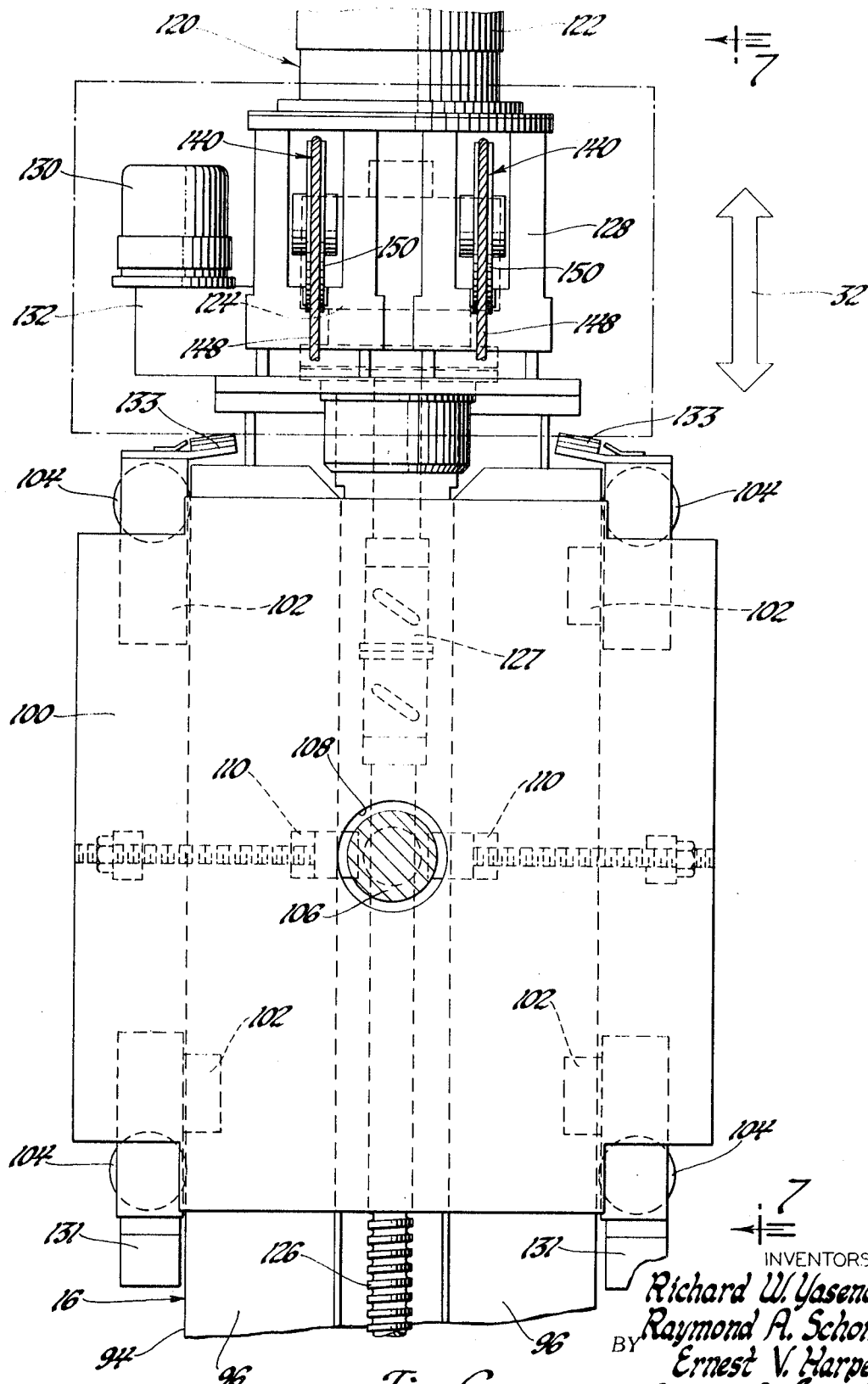
FIG. 6 is a partially sectioned view taken along line 6—6 of FIG. 4.
Figure 7:
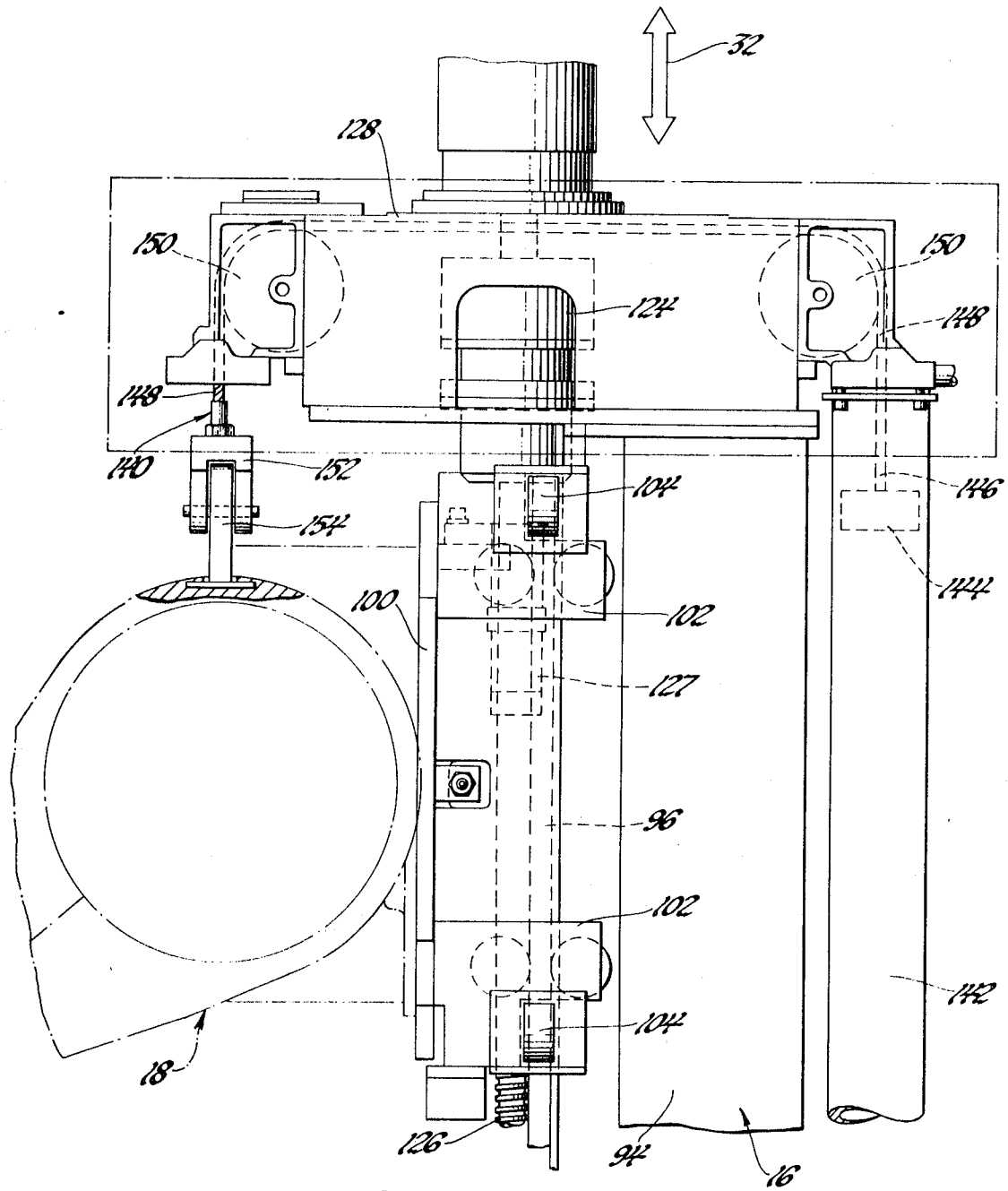
FIG. 7 is a view taken along line 7—7 of FIG. 6.

Referring to FIG. 1, the mast 16 includes a circular base 92 mounted on the top surface of the cart 54 and an upwardly projecting pillar assembly 94. As shown in FIG. 6 and 7, the pillar assembly 94 includes a pair of spaced guide rails 96 which are vertically disposed with respect to the support platform 14. A generally rectangular cart 100 is supported for controlled movement relative to the guide rails 96 along the vertical path 32. The support cart 100 includes four horizontally disposed guide wheel units 102, each including rollers which engage the front and rear surface of the guide rails 96. Four side roller units 104 engage the sides of the guide rails 96, and, in combination with the wheel units 102, constrain movement of the cart to the vertical path 32.

The carriage 18 includes a rearwardly projecting hub 106 which is received in a central opening 108 on the cart 100. By means of screw operated clamping assemblies 110, the carriage 18 may be circumferentially positioned about a horizontal axis relative to the cart 100 for assuming various transverse attitudes with respect to the conveyor path 12. This enables the boom 20 to be positioned with respect to the conveyor line to optimize the rectilinear movements in achieving the desired workhead positioning as would be desirable for vertically inclined articles.

The mast 16 includes vertical drive means 120 comprising a motor 122 coupled through a spring actuated magnetic brake 124 to a lead screw 126 operative coupled to a ball nut 127 which is fixedly connected to the upper end of the cart 100. The motor 122 is mounted at the top platform 128 on the mast 16 and is a DC electric servo motor having high starting torque characteristics. The lead screw 126 extends vertically from the brake 124 between the guide rails 96 and is rotatably supported at its lower end by a support block 129 (FIG. 1). A pair of bumpers 131 attached to the lower edge of the cart 100 engage the base 92 to establish the lower limit of carriage travel. A pair of cantilever spring bumpers 133 on the upper edge of the cart 100 engage the platform 128 to establish the upper limit of carriage travel.

A rotary encoder 130 similar to the encoder 78 is mounted at the side of the platform 128 and is coupled to the drive unit 120 by drive means 132. The encoder 130 generates a digital signal representing the position of the cart 100 as related to revolutions of the lead screw 126 which in turn is related to the vertical position of the carriage 18. The signal from the encoder 130 is fed to the input of a conventional comparing unit in the program control apparatus. The output signal of this comparing unit is fed to a suitable control device which deenergizes the motor 120 when there is an identity between the programmed carriage position and the actual carriage position as signaled by the encoder 130.

A counterweight assembly 140 is provided for counterbalancing the weight and inertia of the carriage 18 and the boom 20. The counterweight assembly 140 generally comprises a pair of laterally spaced air operated cylinders 142 having pistons 144 including piston rods 146 to which a pair of laterally spaced support cables 148 are attached. The cables 148 pass over two sets of wheels 150 supported on the platform 128. Each cable 148 terminates in a vertical run attached to a bracket 152 which is pivotally connected to a handle 154 fixedly attached to the top of the carriage 18. When the carriage 18 is at rest, the pressure in the air cylinders 142 substantially balances the weight of the carriage 18 and attached components. As the carriage 18 moves downwardly, air is controllably exhausted from the cylinders 142 to balance the weight and inertia of the moving parts. As the carriage moves upwardly, additional high pressure air is admitted to the cylinders 142 to balance the weight and inertia of the moving parts.

Figure 2:
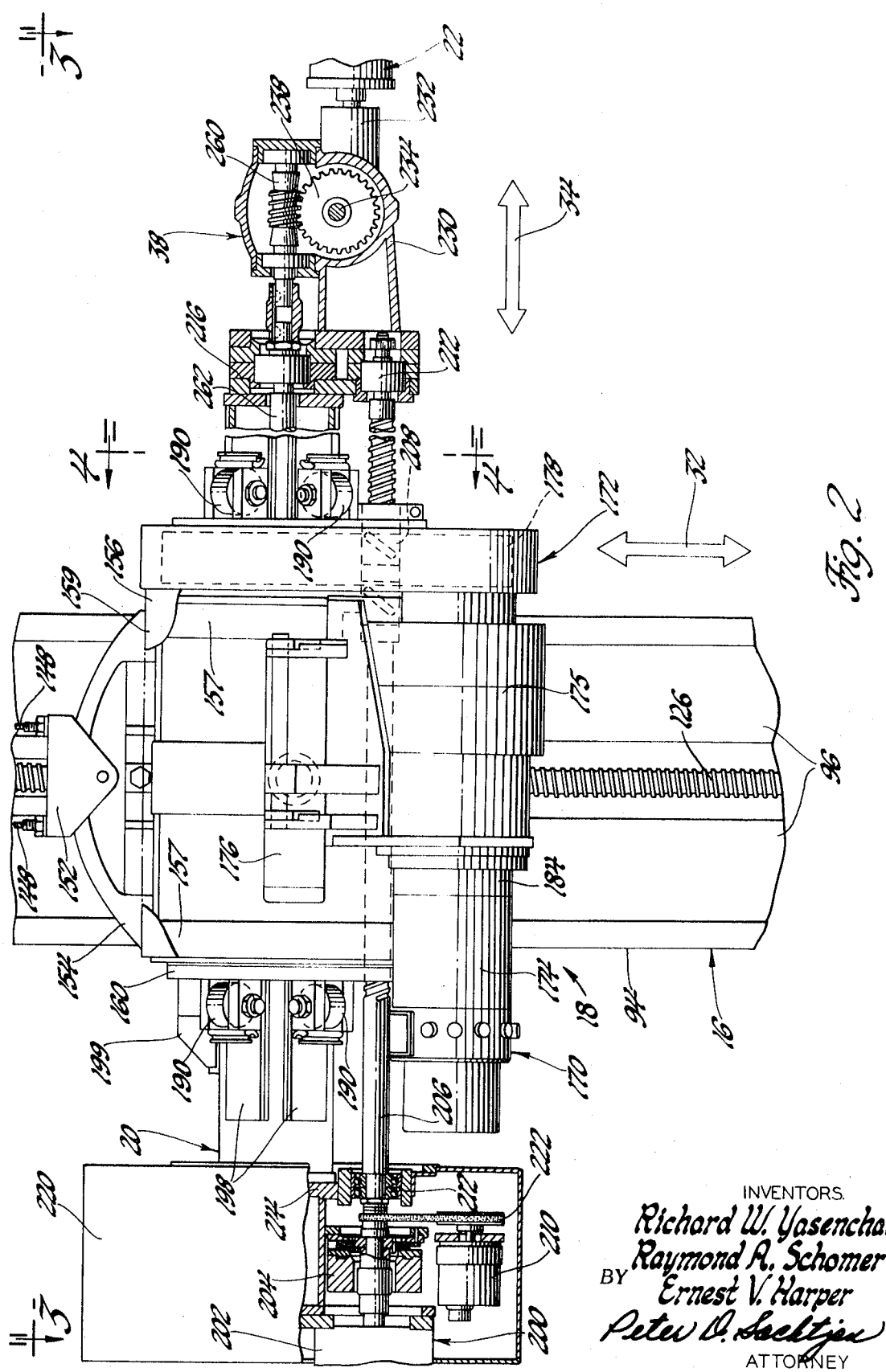
FIG. 2 is an enlarged partially sectioned front view of the carriage and the boom.
Figure 3:
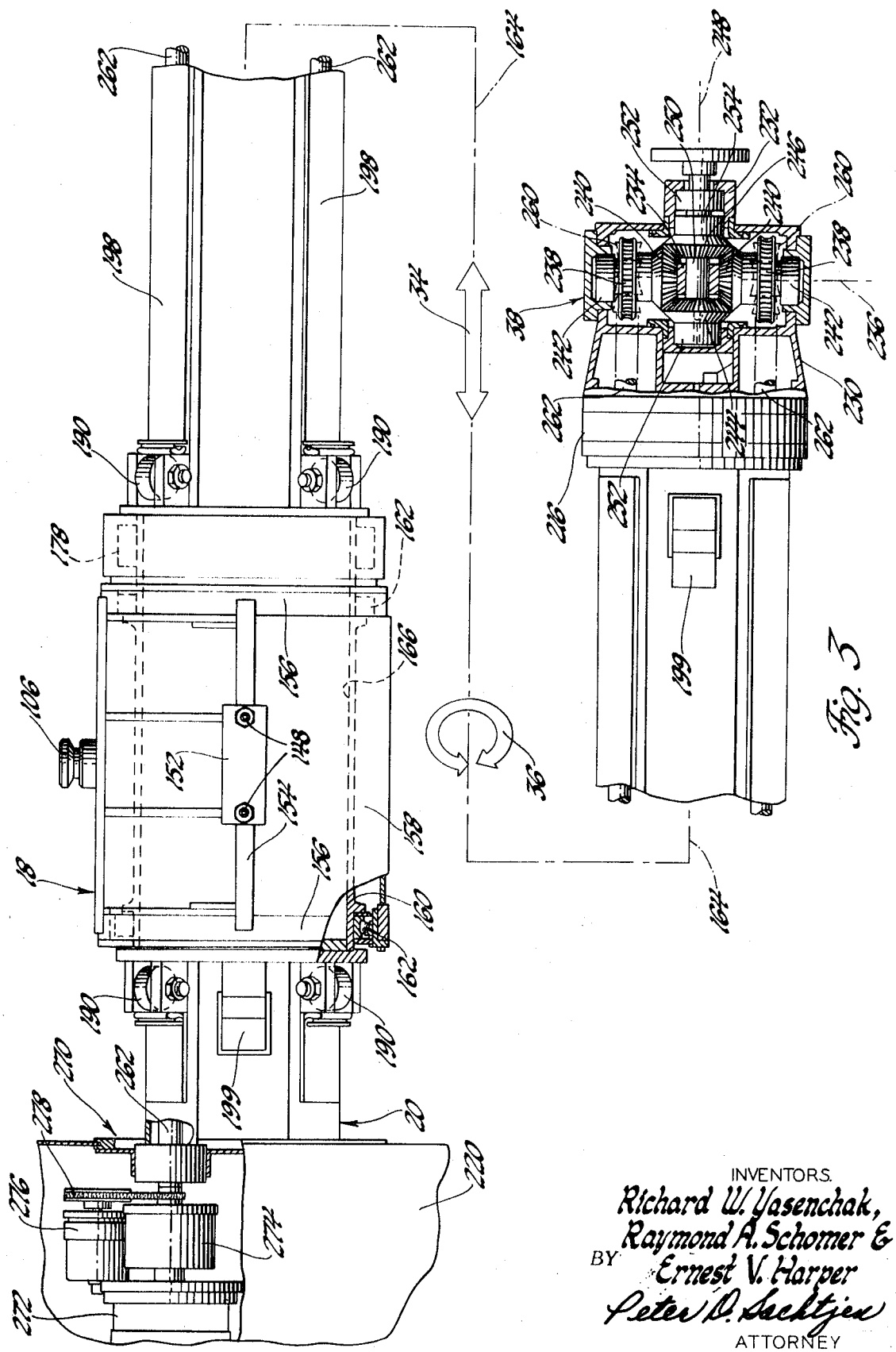
FIG. 3 is a partially sectioned view taken along line 3—3 of FIG. 2.
Figure 4:
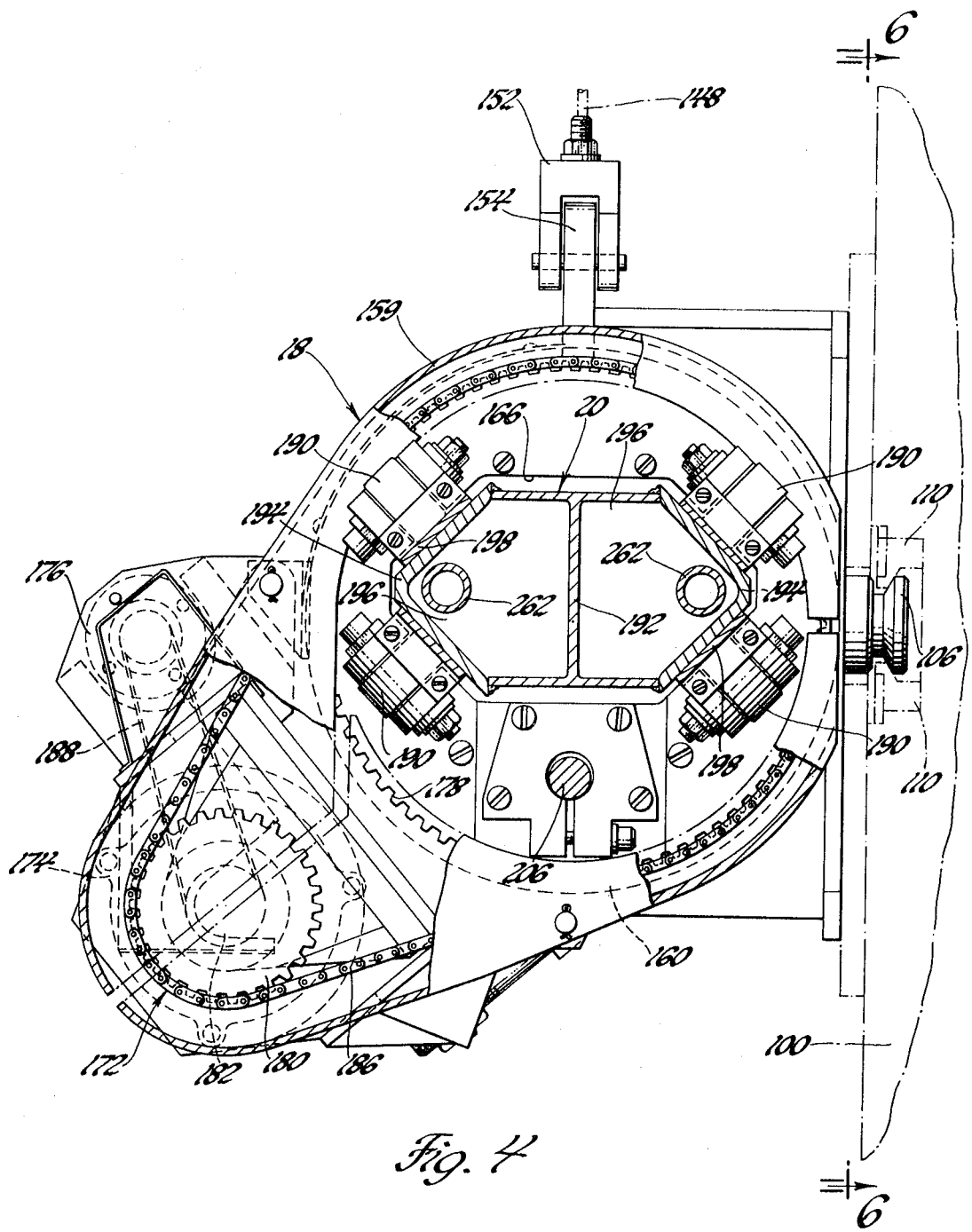
FIG. 4 is a partially sectioned view taken along line 4—4 of FIG. 2.

Referring to FIGS. 2 through 4, the carriage 18 comprises a welded housing 156 supported on an adaptor plate 157 which engages fron surface of the cart 100. The aforementioned hub 106 is centrally fixedly attached to the plate 157 and adjustably clamped against the cart 100 by the jaws 110. The housing 156 is in the form of a weldment having end plates 158 to which the handle 154 is attached. The housing 156 additionally includes a cover 159 and suitable intermediate reinforcing plates to provide the requisite strength.

A cylindrical guide sleeve or drum 160 extends through the interior of the housing 156 and is rotatably supported thereon by axially spaced tapered roller bearings 162 for rotatable movement about a transverse horizontal axis 164 in the aforementioned circular path 36. The drum 160 defines a central passage 166 through which the boom 20 axially extends for reciprocation along an axis parallel to the horizontal axis 164.

The carriage 18 further includes a drive unit 170 including a chain drive 172, a DC electric motor 174 coupled to the chain 172 by a gear reduction unit 175, and an encoder 176 for controllably driving the drum 160 about the axis 164. The chain drive 172 comprises a driven sprocket 178 attached at the outboard end of the drum 160 and a driving sprocket 180 mounted on the output shaft 182 of a brake 184 connected to the motor 174. A precision chain belt 186 drivingly connects the driving sprocket 180 to the driven sprocket 178. The encoder 176 is supported at the front of the carriage 18 and operatively coupled to the shaft 182 by a timing drive 188. Upon energization of the motor 174, the sprocket 180 acting through the chain drives the drum 160 and the boom 20 about the horizontal transverse axis, the encoder 176 comparing the programmed drum position to the actual drum position in the manner described above to actuate the brake 184 and deenergize the motor 174 when there is an identity between positions.

The drum 160 carries four guide roller assemblies 190 at opposite ends thereof which engage the sides of the boom 20 to control reciprocation relative to the transverse horizontal axis 164 in the path 34. More particularly, the boom 20 is in the form of an elongated hollow weldment and generally comprises an I-beam 192 having a pair of V-shaped channels 194 welded to its upper and lower legs to define a pair of pentagonal passages 196. Four guide plates 198 are attached to the sides of the channels 194 and extend horizontally the length of the boom 20. The rollers 190 engage the guide plates 198 to constrain movement of the boom 20 to the path 34. In this regard, it will be noted that the geometrical center of the boom 20 is slightly spaced from the axis of rotation. A pair of stops 199 are attached to the top surface of the I-beam 192 at opposite ends thereof and define the limits of travel along the path 34.

A drive unit 200 serves to position the boom 20 along the transverse path 34. The drive unit 200 comprises an electric motor 202, a magnetic brake 204, a lead screw 206, a ball nut 208, and an encoder 210. The lead screw 206 extends substantially the length of the boom 20 and is supported by bearings 212 mounted on adaptor plates 214, 216 at opposite ends of the boom 20. The ball nut 208 is connected to outboard end of the carriage 18. The motor 202, the brake 204, and the encoder 210 are located within a housing 220 attached to the inboard adaptor plate 214. Upon energization of the motor 210 which is of the aforementioned DC type, the lead screw 206 is appropriately rotated in the desired direction to thereby drive the boom 20 transversely with respect to the carriage 18 and the ball nut 208, which in turn positions the workhead 22 along the transverse axis 134. The encoder 210 is coupled to the lead screw 206 by a timing belt 222 and generates a digital signal in accordance with lead screw revolution. The signal is fed to the input of a comparing unit in the program control apparatus. The comparing unit generates an output which deenergizes the motor 202 when there is an identity between the actual boom position and the programmed boom position.

Referring to FIGS. 2 and 3, the workhead 22 is connected to the boom 20 by the aforementioned differential gear unit 200 which is fixedly mounted on the adaptor plate 216. The gear unit 38 generally comprises a housing 230 and a carrier 232. The housing 230 carries two sets of independently rotatable gears mounted on a spacer shaft 234 for rotation about a transverse axis 236, each of which includes an input worm wheel 238 and a bevel gear 240. The spacer shaft 234 is supported by bearings 242 for rotation about the axis 236 which is perpendicular to and intersects the horizontal transverse axis 164. The carrier 232 includes two bevel gears 244 and 246 which with the gears 240 are rotatable about a swivel axis 248 which is perpendicular to the axis 236. The gear 244 is keyed to an output shaft 250 centrally extending through the carrier 232. The output 250 is rotatably supported on the carrier 232 by bearings 252. The gear 246 is independently rotatably supported on the carrier 232 by bearings 254 and provides dynamic balance for the gear unit 38 and uniform loading on the gear teeth. The workhead 22 is connected to and movable with the output shaft 250 about the axes 236 and 248.

A worm gear 260 mounted at the end of a drive shaft 262 engages each worm wheel 238. As shown in FIG. 4, the drive shafts 262 extend through the openings 196 between the beam 192 and the channels 194. Each drive shaft 262 comprises part of a drive unit 270 which additionally includes a DC electric servo motor 272, a magnetic brake 274, and an encoder 276 which is drivably coupled to the shaft 262 by a timing belt 278. The encoder is of the aforementioned type and generates a digital signal representing a position of the workhead 22 as related to revolutions of the drive shaft 262. The signal from the encoder 276 is fed to the input of a conventional comparing unit in the program control apparatus. The output signal from the comparing unit is fed to the control device which deenergizes the motor 272 when there is an identity between the programmed workhead position in the memory core unit of the program control apparatus and the actual workhead position signaled by the encoder 276.

In operation, the shafts 262 are adapted to be independently energized in the same or opposite directions. When the drive shafts 262 are commonly rotated, the worm gears 260 are rotated in the same direction thereby causing the worm wheels 238 and gears 240 to rotate in the same direction about the axis 236. Inasmuch as there is no relative movement between the gears 240, the gears 244 and 246 are locked thereby driving the carrier 232 about the axis 236 to position the workhead in the bend path 40. When a single drive shaft 262 is rotated, the driven worm wheel 238 will rotate the bevel gear 240 which will rotate the gears 244, 246 in a common direction about the axis 248 thereby rotating the output shaft 238 and positioning the workhead 22 in the swivel path 42. When the drive shafts 262 are rotated in opposite directions, the workhead 22 will be jointly rotated about the axes 236 and 248 for concurrent positioning in the bend path 40 and swivel path 42.

With respect to the workhead 22, the jaws 110 each contain an electrode which is conventionally connected to a source of power and, when a closing movement is applied to clamp the jaws against the article to be processed, power is applied to the electrodes to perform a spot welding operation thereon. As previously mentioned, the workhead may also perform additional processing operations such as drilling, handling, painting, or the like.

OPERATION OF THE SIX-AXIS MANIPULATOR

The above-described six-axis manipulator 10 provides for universally positioning of the workhead 22 in work processing relationship to articles traversing conveyor path 12 by executing in sequence select movements along the axes of freedom. In the hereinafter described operation, it should be remembered that the various motions between processing location may be concurrent or sequential.

Referring to FIGS. 1 and 5, the vehicle panels 90 progress along conveyor 89 toward the manipulator 10 as driven by suitable drive units. At a predetermined location, the dog 87 of the tracker 86 locks onto the gate lock 88 to position reference the conveyor movement. Concurrently therewith, the drive unit 56 is energized to drive the cart 54 along the platform 14 in the longitudinal path 30, compensation for conveyor movement being provided in traveling to the first processing location.

For positioning along the vertical path 32, the drive unit 170 is energized to drive the carriage 18 and the boom 20 to the desired vertical position. When the actual vertical position corresponds to the programmed vertical position as determined by the encoder and the comparing units, the drive unit 170 is deenergized to lock movement in the vertical path 32.

For movement along the transverse path 34, the drive unit 200 is energized to reciprocate the boom 20 with respect to the carriage 18 and achieve transverse positioning of the workhead 22. When the actual traverse position corresponds to the programmed traverse position as determined by the encoder and the comparing units, the drive unit 200 is deenergized to lock the workhead 22 for positioning the workhead along the path 34.

For positioning the workhead 22 about the rotary path 36, the drive motor 170 is energized until the actual rotated position of the workhead 22 about the transverse axis corresponds to the programmed position at which time the drive unit 170 is deenergized. The workhead 22 is positioned with respect to the aforementioned locked axes by selective energization of the drive units 270 which positions the workhead 22 with respect to the article by select rotation in the bend path 40 and the swivel path 42.

When the above positions have been reached, the workhead 22 is energized to automatically perform the spot welding operation and thereafter the machine executes a second set of motions in traversing to the second work processing location in the manner outlined above. Similarly, additional processing operations are performed in programmed sequence until the far end of the machine at which time the drive unit 56 is reversed to return the cart 54 to its predetermined starting position.

Thus, the above machine will universally position the spot welder in work processing relationship with articles on the conveyor path 12 by optimum utilization of the rectilinear and rotational axes. At the same time, the movements are executed quickly, accurately, and repetitively by the positive drive means described above, thereby assuring that the manipulator will operate at a high efficiency, both as to speed and accuracy.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A machine for processing articles comprising: a support member; a first arm carried by said support member for controlled movement therealong; means including an electric motor and lead screw means operatively connected to said first arm for selectively moving the latter relative to said support member along a longitudinal axis; carriage means carried by said first arm for movement along a first transverse axis relative to said support member; means including an electric motor and lead screw means operatively connected to said carriage means for selectively moving the latter along said transverse axis; guide means supported by said carriage means for rotation about a second transverse axis relative to said support member and said first arm; means for rotating said guide means about said second transverse axis; a second arm carried by said guide means for reciprocation parallel to said second transverse axis; means including an electric motor and lead screw means operatively connected to said carriage for selectively reciprocating said second arm parallel to said second transverse axis; differential gear means connected to said second arm having an output member rotatable and pivotable about a pair of independent axes and adapted to support a workhead unit; drive means connected to said differential gear means for selectively positioning said workhead unit about said independent axes whereby said workhead unit is universally positionable in working relationship with articles to be processed, and means connecting said carriage means to said first arm so as to permit said carriage means to be adjustably rotated about an axis perpendicular to said first transverse axis.

2. A machine having multiple degrees of freedom for processing articles moving along a conveyor path, comprising: a support platform having guide members parallel to said conveyor path; a cart supported on said guide members; drive means including an electric motor and lead screw means operatively connected to said cart for selectively moving the latter along said guide members on a longitudinal axis; a mast carried by said cart having guide members transverse to said support platform; a carriage, means supporting said carriage on said second-mentioned guide members for movement along a vertical axis relative said conveyor path and for adjustable rotational movement about a horizontal axis, drive means including an electric motor and lead screw means extending parallel to said second-mentioned guide members and operatively connected to said carriage for selectively moving the latter along said vertical axis; a rotatable drum supported on said carriage having a guide passage therein aligned mutually transverse to said conveyor path, said support platform and said mast, said guide passage defining a transverse axis; drive means for rotating said drum about said transverse axis; a boom received in said guide passage for reciprocation parallel to said transverse axis; drive means including an electric motor and lead screw means extending along said boom and operatively connected to said drum for selectively reciprocating said boom along said transverse axis; a twin input, single output differential unit having input gears defining a bend axis transverse to said boom and an output gear defining a swivel axis transverse to said bend axis, said output gear adapted to support a workhead for movement about said bend and swivel axes; a pair of drive shafts connected to said input gears; drive means for independently rotating said drive shafts to selectively rotate said input gears and said output gear to position said workhead about said swivel axis and said bend axis and, in combination with movement relative to the other axes, universally position said workhead in work processing relationship against articles moving along said conveyor path.

3. A six-axis manipulator having multiple degrees of freedom for processing articles moving along a conveyor path, comprising: an elongated support platform having guide rails parallel to said conveyor path; a cart supported on said guide rails for controlled movement therealong; an electric motor and lead screw extending along said platform parallel to said rails and operatively connected to said cart for selectively driving said cart along a longitudinal first axis; a mast adjustably circumferentially supported by said cart and having guide rails extending vertically with respect to said support platform; a carriage adjustably circumferentially supported on said second-mentioned guide rails of said mast for movement along a vertical second axis; an electric motor and lead screw extending parallel to said second-mentioned guide rails and operatively connected to said carriage for selectively driving the latter along said vertical second axis; a rotatable drum supported on said carriage having a guide passage therein mutually transverse to said conveyor path, said support platform and said mast and defining a transverse third axis; drive means for rotating said guide sleeve about said transverse third axis; a boom received in said guide passage for reciprocation along a fourth axis parallel to said transverse third axis; an electric motor and lead screw extending along said boom and operatively connected to said drum for selectively reciprocating said boom along said transverse fourth axis; a twin input, a single output differential unit connected to the end of said boom, said differential unit having input gears defining a bend fifth axis transverse to said boom and an output gear adapted to be connected to a workhead, said output gear defining a swivel sixth axis transverse to said bend axis; a pair of drive shafts including gear means connected to said input gears; means for independently rotating said drive shafts to selectively rotate said input gears and said output gear to position said workhead about said swivel and bend axes whereby said workhead is positionable about six independent axes for achieving universal work processing relationship against articles moving along said conveyor path.

4. A six-axis manipulator having multiple degrees of freedom for processing articles moving along a conveyor path, comprising: an elongated support platform having guide rails parallel to said conveyor path; a cart supported on said guide rails for controlled movement along a longitudinal first axis; an electric motor and a ball screw drive operatively connected between said support platform and said cart for selectively driving the latter along said longitudinal first axis; a mast supported by said cart having guide rails extending vertically with respect to said support platform; means for adjustably circumferentially positioning said mast relative to said cart about an axis perpendicular to said support platform; a carriage supported on said second-mentioned guide rails for movement along a vertical second axis; means for adjustably circumferentially positioning said carriage about an axis parallel to said support platform; an electric motor and a ball screw drive operatively connected between said carriage and said mast for driving said carriage selectively along said vertical second axis; a rotatable drum supported on said carriage having a guide passage therein aligned mutually transverse to said conveyor path, said support platform and said mast, said guide passage defining a transverse third axis; an electric motor and chain drive for rotating said drum about said transverse third axis; an elongated hollow boom received in said guide passage for reciprocation along a fourth axis parallel to said transverse axis; an electric motor and ball screw drive extending along said boom and operatively connected between said drum and said boom for selectively reciprocating said boom along said transverse fourth axis; a twin input, single output differential unit carried on one end of the boom, said unit having input gears mounted on a shaft defining a bend fifth axis transverse to said boom and an output gear meshing with said input gears and mounted on an output shaft defining a swivel sixth axis transverse to said bend axis; a pair of drive shafts extending through said boom and having output ends operatively connected to said input gears; a pair of electric motors carried on the other end of the boom and operatively connected to the input ends of said drive shafts for selectively rotating said output shaft about said swivel and bend axes; counterweight means operatively connected between the mast and the carriage balancing the weight and inertia of said carriage, said boom, and said differential unit; and a workhead attached to said output shaft whereby selective energization of said motors will universally position said workhead in work processing relationship in six axes of freedom with respect to articles moving along said conveyor path.

* * * * *